United States Patent [19]
Wike

[11] Patent Number: 5,333,747
[45] Date of Patent: Aug. 2, 1994

[54] METHOD AND APPARATUS FOR SECURING A DRAW BAND TO A DRUM

[76] Inventor: John R. Wike, 7227 Poplar Pke, Germantown, Tenn. 38138

[21] Appl. No.: 67,360

[22] Filed: May 24, 1993

[51] Int. Cl.⁵ ............................................. B65D 45/32
[52] U.S. Cl. .................. 220/320; 292/256.6; 411/412; 29/525.1
[58] Field of Search ............ 220/320; 292/256.6, 292/256.65, 256.67; 411/361, 412, 413; 24/20 LS, 20 W, 37; 29/525.1, 517, 508

[56] References Cited

U.S. PATENT DOCUMENTS

| | | |
|---|---|---|
| 159,508 | 2/1875 | Gray . |
| 252,186 | 1/1882 | Clark . |
| 255,428 | 3/1882 | Graham . |
| 258,497 | 5/1882 | Stevens . |
| 348,426 | 8/1886 | Shellenberger . |
| 607,725 | 7/1898 | Worst et al. . |
| 832,807 | 10/1906 | Pond . |
| 960,349 | 6/1910 | Lafleur . |
| 1,151,632 | 8/1915 | Wall . |
| 1,403,312 | 1/1922 | Gannon . |
| 2,625,721 | 1/1953 | Lockhart ............... 292/256.67 X |
| 2,633,616 | 4/1953 | Kohout ................. 292/256.67 |
| 3,859,837 | 1/1975 | Burroughs ............. 29/508 X |
| 4,076,291 | 2/1978 | Pope et al. ............. 292/256.67 |
| 4,813,834 | 3/1989 | Smith . |
| 4,917,555 | 4/1990 | Taubert . |
| 4,957,317 | 9/1990 | Jakubas ................ 292/256.67 |
| 4,983,084 | 1/1991 | Gray .................... 411/361 X |
| 4,995,777 | 2/1991 | Warmington ........... 411/361 |

Primary Examiner—Allan N. Shoap
Assistant Examiner—Jes F. Pascua
Attorney, Agent, or Firm—Walker, McKenzie & Walker

[57] ABSTRACT

A tamper proof draw band bolt apparatus and method including a bolt for extending through the apertures in the first and second lugs of a draw band, the bolt including a shaft having a first end and a second end, the shaft of the bolt having a threaded portion and a fettered portion with no angular pitch; a nut having a threaded aperture for screwably receiving the threaded portion of the shaft of the bolt and for allowing the bolt and the nut to coact with one another to draw the first and second lugs of the draw band toward one another; and a sleeve for crimping to the lettered portion of the shaft of the bolt after the first and second lugs of the draw band have been drawn together by the coaction between the bolt and the nut and for preventing undetected subsequent separation of the first and second lugs of the draw band.

11 Claims, 2 Drawing Sheets

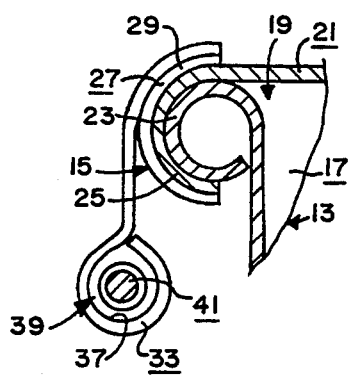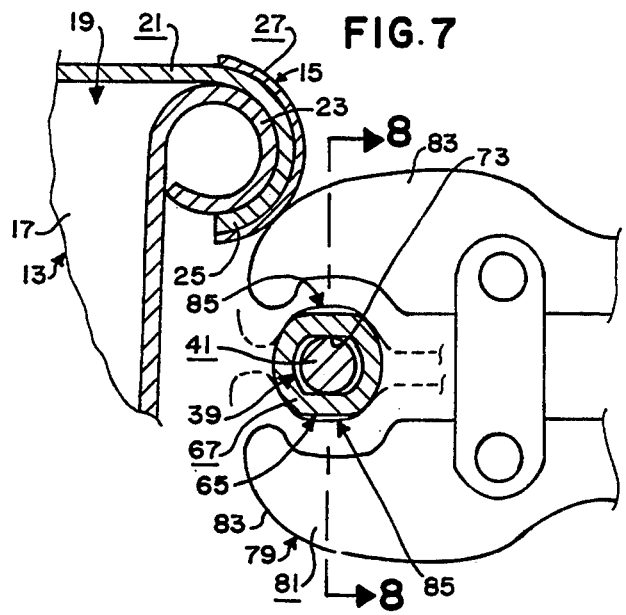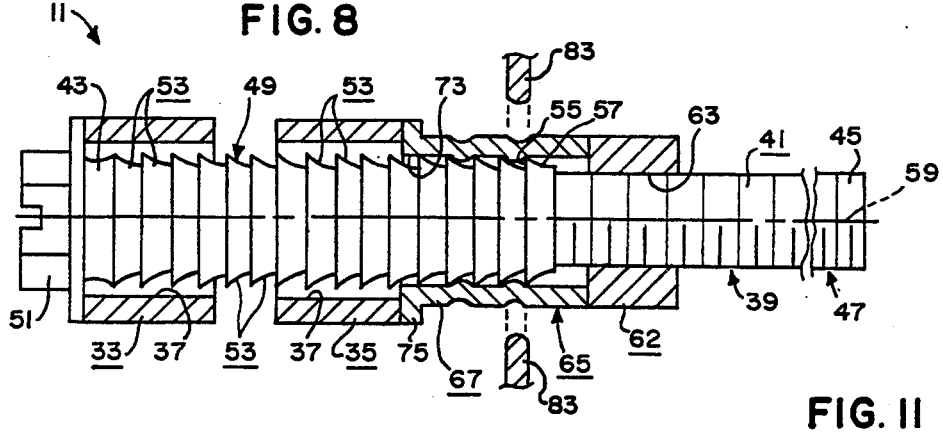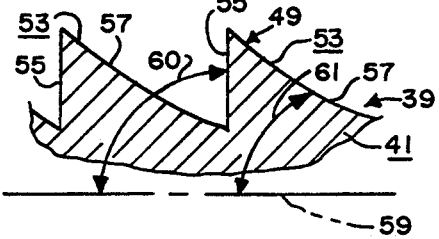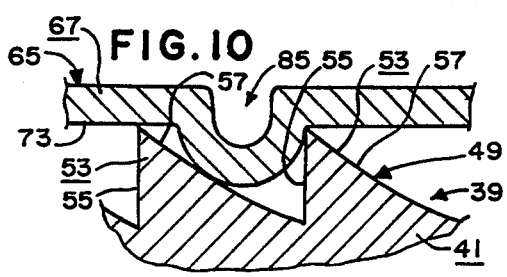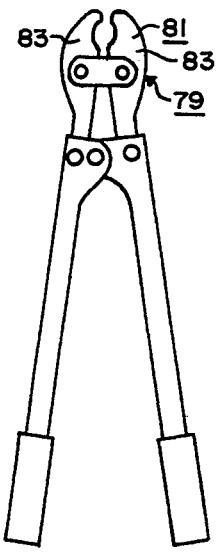

METHOD AND APPARATUS FOR SECURING A DRAW BAND TO A DRUM

BACKGROUND OF THE INVENTION

1. Field of the Invention

The present invention relates, in general, to the field of shipping containers, drums and the like, and is particularly directed toward providing a method and an apparatus for securing a draw band to a drum in a tamper proof manner.

2. Description of the Related Art

A common drum used for the shipping and storage of various liquid and powered material such as soft drink ingredients, fruit juice ingredients, chemicals, and the like includes a hollow cylindrical body having one closed end and an open mouth at the other end for being selectively closed by a lid or the like using a draw band that can be tightened around the circumference of the lid and edge of the open mouth of the drum body to secure the lid over the mouth and thereby prevent unauthorized access to the interior of the drum body, etc. The drum body may be metal and a plastic liner may be used within the metal body.

Heretofore, bolts and nuts of common use and standard design and manufacture have been used to tighten draw bands or rings placed around the edge of the drum mouth and over the outer edge of the drum lid to draw tight, seal and close the lid on drums of various sizes. Such standard bolts and nuts have commonly been the only securing, drawing, and tightening means used when attaching such draw bands to drums, with the bolt shafts passing through lugs welded onto the ends of the draw bands.

A common problem with such drums has been a lack of security for restraining unauthorized agents from simply unthreading the common bolt and nut fixed in a draw band, and from stealing, contaminating or adulterating the contents of the drum. Product liability exposure through accidental spillage, or potential for blackmail through adulteration or threatened spillage, is a grave concern for packagers of certain products. Some limited attempts have been made by draw band and drum manufacturers to secure the bolt and nut with wire tags or seals similar to those used by many public utility companies to secure utility meters and the like. None of the known attempts have achieved a fool-proof means in any practical or economical manner.

Smith, U.S. Pat. No. 4,813,834, issued Mar. 21, 1989, discloses a fastening system including a two piece swage type fastener including a pin and a collar adapted to be swaged into circumferentially extending lock grooves in the pin and with the collar having a radially inwardly extending flexible tab located at one end and being engageable with the lock grooves for pre-assembling the work pieces to be secured prior to swaging. Each of the lock grooves has a first flank or side that is at a 70 degree angle to the center line or longitudinal axis of the shaft of the pin and has a second flank or side that is at a 35 degree angle to the center line or longitudinal axis of the shaft of the pin.

Taubert, U.S. Pat. No. 4,917,555, issued Apr. 17, 1990, discloses a joining element for two machine parts. The joining element includes a fastener or screw shank having a head. A plurality of parallel, concentric fit-stretch rings are provided adjacent the head. The external diameter of the fit-stretch rings are 0.1 to 0.5 millimeters larger than the external diameter of the fastening thread. Each of the fit-stretch rings are shown as having a first or leading flank or side and a second or following flank or side that are both at approximately 75 degree angles to the center line or longitudinal axis of the shaft of the screw shank.

Warmington, U.S. Pat. No. 4,995,777, issued Feb. 26, 1991, discloses a self-retaining collar for a pin of a two-piece fastener having a projection or detent from its inner surface for engaging locking grooves of the pin. The pin has a head and a shank, the locking grooves being formed on the shank. The fastener holds two or more work pieces together in tension by inserting the pin through the work pieces until the head contacts one side of the work pieces and the locking grooves extend through the other side. The shank has pulling grooves located on the end opposite the head. Once the pin is through the work pieces, the collar is slid over the shank until the detent engages the lands of one of the locking grooves. The collar is then swaged into the locking grooves while the work pieces are placed in tension by pulling on the pulling grooves of the pin. The locking grooves are V-shaped in cross-section (see FIGS. 1, 2 and 3 of the Warmington patent) and resemble a standard *American National* thread, having first or leading flanks or sides and second or following flanks or sides that are at approximately 60 degree angles to the center line or longitudinal axis of the shaft of the pin shank.

Nothing in the known prior art discloses or suggests the present invention. More specifically, nothing in the known prior art discloses or suggests a method or an apparatus for securing a draw band to a drum in a tamper proof manner including inserting the shaft of a bolt means having a threaded portion and a lettered portion through the aperture in a first lug of a draw band and through a aperture in a second lug of the draw band after a lid has been placed over the open mouth of the body of a drum and the draw band has been placed over the outer edge of the lid and the lip of the open mouth of the body of the drum; sliding a sleeve means over the shaft of the bolt means until the body of the sleeve means contacts the edge of the second lug of the draw band; screwing a nut onto the threaded portion of the shaft of the bolt means, ultimately causing the first and second lugs of the draw band to be pulled or drawn toward one another; and crimping the sleeve means to the fettered portion of the shaft of the bolt means for preventing undetected subsequent separation of the first and second lugs of the draw band.

SUMMARY OF THE INVENTION

The present invention is directed, in general, toward providing an improved method and apparatus for securing a draw band to a drum that prevents tampering with the contents of the drum while allowing the use of standard drums, lids and draw bands. The primary object of this invention is to provide a fool-proof bolt lock device and assembly method to assure that the bolt and lock cannot be removed by unauthorized agents, without partial or complete destruction of the bolt lock assembly. Preferably, the bolt lock is applied by the authorized packer, is of special design procured through controlled purchase, through authorized sources of manufacture, is applied by special tools, and is not commonplace to purchase through any hardware, or other commercial suppliers.

The tamper proof draw band bolt apparatus and method of the present invention includes, in general, bolt means for extending through the apertures in the first and second lugs of a draw band, the bolt means including a shaft having a first end, a second end, a threaded portion and a fettered portion; a nut having a threaded aperture for screwably receiving the threaded portion of the shaft of the bolt means and for allowing the bolt means and the nut to coact with one another to draw the first and second lugs of the draw band toward one another; and sleeve means for crimping to the fettered portion of the shaft of the bolt means after the first and second lugs of the draw band have been drawn together by the coaction between the bolt means and the nut and for preventing undetected subsequent separation of the first and second lugs of the draw band.

The bolt lock of the present invention is designed to close and tighten the draw band around the circumference of the drum lid and drum body. The tamper-proof feature is needed to protect the contents of such drums from malicious contamination, adulteration, or spillage by unauthorized agents, or accidental opening in transit.

It is well known in the industries shipping foods, toxic chemicals, and poisons that their liability and financial exposure has intensified to the point where a better securing device with fool-proof features and/or a tamper-proof locking method is needed. One object of the present invention is to provide an apparatus and method of assembly that provides a tamper-proof attachment of the draw band around the circumference of the drum lid and drum body.

BRIEF DESCRIPTION OF THE DRAWINGS

FIG. 6 is a sectional view substantially as taken on line 6—6 of FIG. 5.

FIG. 7 is a sectional view substantially as taken on line 7—7 of FIG. 5 but showing a portion of a crimping tool in broken lines crimping the sleeve means of the preferred embodiment of the apparatus of the present invention to the bolt means thereof.

FIG. 8 is a sectional view substantially as taken on line 8—8 of FIG. 7 with portions thereof omitted for clarity.

FIG. 9 is an enlarged sectional view of a portion of the bolt means of the preferred embodiment of the apparatus of the present invention.

FIG. 10 is an enlarged sectional view of portions of the bolt means and sleeve means of the preferred embodiment of the apparatus of the present invention, showing the sleeve means crimped to the bolt means.

FIG. 11 is an elevational view of the crimping means of the preferred embodiment of the apparatus of the present invention.

DESCRIPTION OF THE PREFERRED EMBODIMENT

Figure 1:
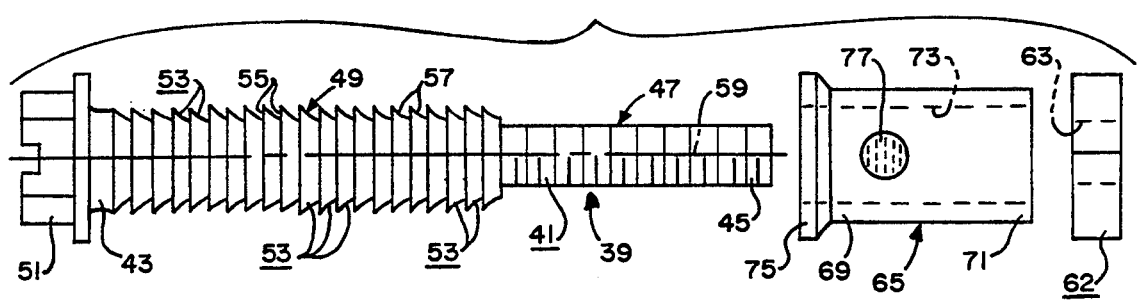
FIG. 1 is an exploded front elevational view of the preferred embodiment of the tamper proof draw band bolt apparatus of the present invention.
Figure 2:
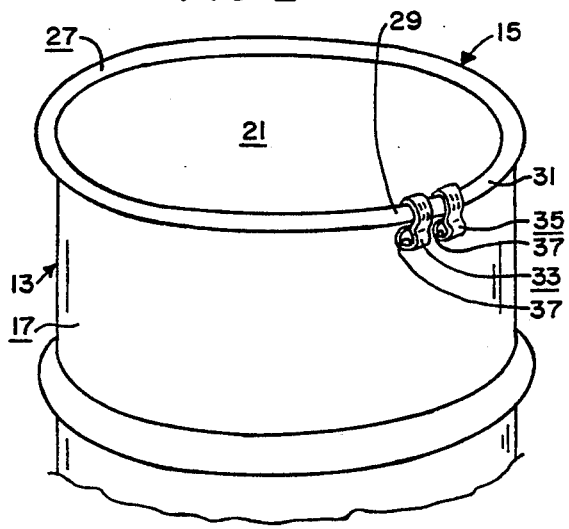
FIG. 2 is a perspective view of the top of a removable head drum showing a draw band mounted thereon.
Figure 3:
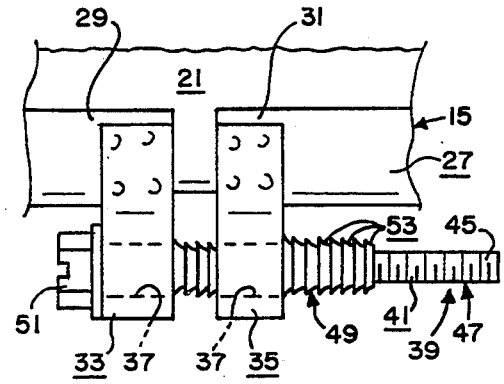
FIG. 3 is a somewhat diagrammatic top plan view of a portion of the drum of FIG. 2 showing the bolt means of the preferred embodiment of the apparatus of the present invention inserted through the opposing lugs of the draw band, with parts thereof broken away and/or slightly moved for clarity.
Figure 4:
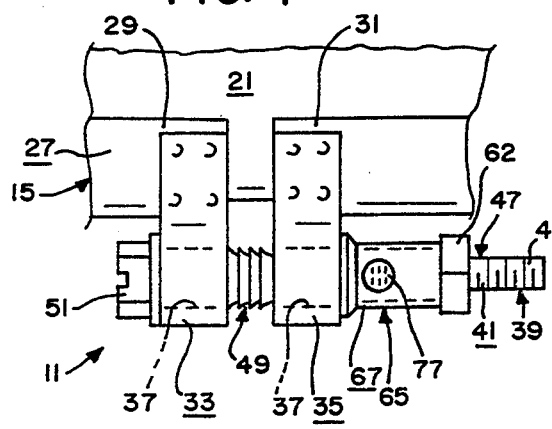
FIG. 4 is similar to FIG. 3 but shows the sleeve means and nut of the preferred embodiment of the apparatus of the present invention attached to the bolt means thereof.
Figure 5:
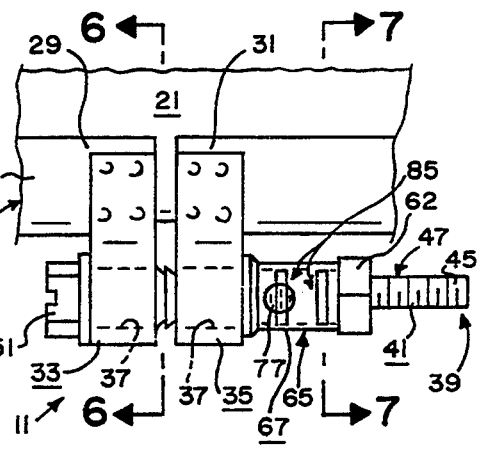
FIG. 5 is similar to FIG. 4 but shows the draw band drawn tight by coaction between the bolt means and the nut of the preferred embodiment of the apparatus of the present invention and shows the sleeve means of the preferred embodiment of the apparatus of the present invention crimped to the fettered portion of the bolt means thereof.

The preferred embodiment of the tamper proof draw band bolt apparatus of the present invention is shown in FIGS. 1 and 3–10, and identified by the numeral 11. The tamper proof draw band bolt apparatus 11 is for use in combination with a drum 13 and a draw band 15. The specific size, design, construction and operation of the drum 13 and draw band 15 may vary as is well known to those skilled in the art.

The drum 13 may consist of a typical steel drum or the like including a body 17 having an open mouth 19, and including a lid 21 for removably closing the open mouth 19 of the body 17. The open mouth 19 of the body 17 of the drum 19 has a lip 23 and the lid 21 of the drum 13 has an outer edge 25 for engaging the lip 23.

The draw band 15 may be constructed in various specific manners for encircling at least a portion of the outer edge 25 of the lid 21 of the drum 13 and the lip 23 of the open mouth 19 of the body 17 of the drum 13. Thus, the draw band 15 preferably includes a body 27 having a first end 29 and a second end 31, a first lug 33 attached to the first end 29 of the body 27 thereof, and a second lug 35 attached to the second end 31 of the body 27 thereof. Each of the lugs 33, 35 has an aperture 37 therethrough. The body 27 of the draw band 15 may be constructed of a length of spring steel or the like having the cross sectional shape of a circular ring sector or the like as clearly shown in FIG. 7 for engaging the outer edge 25 of the lid 21 and the lip 23 of the open mouth 19 of the body 17 of the drum 13. The lugs 33, 35 may be bent or otherwise formed out of metal and welded or otherwise fixedly attached to the respective ends 29, 31 of the body 27. It should be noted that the body 27 may be sized so that the ends 29, 31 thereof overlap one another when encircling the outer edge 25 of the lid 21 and the lip 23 of the open mouth 19 of the body 17 of the drum 13. In such a construction, one of the lugs 33, 35 is spaced back from the distal end of the respective end 29, 31 of the body 27 of the draw band 15 to allow proper clearance between the lugs 33, 35, etc., as will now be apparent to those skilled in the art.

The tamper proof draw band bolt apparatus 11 of the present invention is used to secure the draw band 15 to the drum 13 in a manner that prevents undetected subsequent removal of the lid 21 from the open mouth 19 of the drum 13.

The tamper proof draw band bolt apparatus 11 includes bolt means 39 for extending through the apertures 37 in the first and second lugs 33, 35 of the draw band 15. The bolt means 39 includes a shaft 41 having a first end 43 and a second end 45. The shaft 41 of the bolt means 39 has a threaded portion 47 and a fettered portion 49. The bolt means 39 includes an enlarged head 51 attached to the first end 43 of the shaft 41 thereof. The fettered portion 49 preferably includes a plurality of rings 53 on the surface of the shaft 41 of the bolt means 39 with no angular pitch so that the fettered portion 49 has no lead component (i.e., rotation of a mating part around the fettered portion 49 of the shaft 41 will not result in an axial movement of the mating part or of the shaft 41). This is a very important and critical feature of the present invention for preventing undetected removal of or tampering with the draw band 15. Each of the rings 53 preferably has a first side 55 directed toward the first end 43 of the shaft 41 of the bolt means 39 and a second side 57 directed toward the second end 45 of the shaft 41 of the bolt means 39. The first side 55 of each of the rings 53 is preferably substantially perpendicular to the center line or longitudinal axis 59 of the shaft 41 of the bolt means 39. That is, for the apparatus 11 to perform satisfactory, the angle between the first side 55 of each of the rings 53 and the center line or longitudinal axis 59 of the shaft 41 of the bolt means 39 is preferably within the range of 85 degrees to 95 degrees. For optimum performance, the angle between the first side 55 of each of the rings 53 and the center line or longitudinal axis 59 of the shaft 41 of the bolt means 39 should be 90 degrees as indicated by the arrow 60 in FIG. 9. The angle between the second side 57 of each ring 53 and the center line or longitudinal axis 59 of the shaft 41 is not critical to the performance of the present invention and should be determined based on the desired strength of the rings 53, etc., as will now be apparent to those skilled in the art. Thus, for example, the angle between the second side 57 of each ring 53 and the center line or longitudinal axis 59 of the shaft 41 may be approximately 30 degrees as indicated by the arrow 61 in FIG. 9.

The threaded portion 47 of the shaft 41 of the bolt means 39 is preferably located adjacent the second end 45 of the shaft 41 and the fettered portion 49 of the shaft 41 is preferably located between the threaded portion 47 thereof and the first end 43 of the shaft 41 of the bolt means 39 as clearly shown in FIG. 1. The bolt means 39 may be manufactured in various sizes and designs out of various materials in various manners as will now be apparent to those skilled in the art. Thus, for example, the bolt means 39 may be machined or otherwise formed out of steel with the threaded portion 47 of the shaft 41 and the fettered portion 49 of the shaft 41 roll threaded or otherwise cut or milled therein using dies or the like as will now be apparent to those skilled in the art.

The tamper proof draw band bolt apparatus 11 includes a nut 62 having a threaded aperture 63 for screwably receiving the threaded portion 47 of the shaft 41 of the bolt means 39 and for allowing the bolt means 39 and the nut 62 to coact with one another to draw the first and second lugs 33, 35 of the draw band 15 toward one another. The nut 62 preferably consists of a standard, off-the-shelf nut sized to be screwed onto the threaded portion 47 of the shaft 41 of the bolt means 39.

The tamper proof draw band bolt apparatus 11 includes sleeve or sleeve defining means 65 for crimping to the shaft 41 of the bolt means 39 after the first and second lugs 33, 35 of the draw band 15 have been drawn together by the coaction between the bolt means 39 and the nut 62 and for preventing undetected subsequent separation of the first and second lugs 33, 35 of the draw band 15. The sleeve means 65 preferably includes a generally cylindrical body 67 having a first end 69 and a second end 71 and having an internal bore or aperture 73 extending between the first and second ends 69, 71 thereof generally along the longitudinal axis thereof. The cylindrical body 67 preferably has an outwardly directed flange 75 at the first end 69 thereof. The sleeve means 65 may be machined, cast or otherwise made from steel, aluminum, zinc casting or synthetic resin which when crimped, or swaged, or formed onto the fettered portion 49 of the shaft 41 of the bolt means 39, will internally lock onto one or more rings 49 of the fettered portion 49 of the shaft 41 of the bolt means 39. The size of the sleeve means 65 may vary depending on the size of the drum 13, draw band 15, bolt means 39, and nut 62, etc., as will now be apparent to those skilled in the art. The aperture 73 is preferably sized so that the body 67 of the sleeve means 65 can be easily slipped over the threaded portion 47 and lettered portion 49 of the shaft 41 of the bolt means 39. Another important improvement of the present invention is to color code the sleeve means 65 by applying color code means such as paint 77 to all or a portion of the outer surface of the body 67 of the sleeve means 65 for each production lot manufactured or sold, for allowing tracing of the sleeve means 65 by thereby giving the packer or user of the tamper proof draw band bolt apparatus 11 a system of traceable lots, etc., as will now be apparent to those skilled in the art. It should be understood that while the paint 77 is shown in the drawings as covering only a portion of the outer surface of the body 67 of the sleeve means 65, it is preferred that the paint 77 be applied to the entire surface of the sleeve means 65.

The present invention preferably includes a crimping means 79 (see FIGS. 7, 8 and 11) for crimping the sleeve means 65 to the fettered portion 49 of the shaft 41 of the bolt means 39. The crimping means 79 includes jaw means 81 for covering the exterior diameter of the body 67 of the sleeve means 65 and for forming crimps 85 in the body 67 of the sleeve means 65 (see, in general, FIGS. 5, 8 and 10) by applying concentrated pressure to the body 67. The crimping means 79 preferably consists of a substantially standard pliers-type hand tool having a uniquely designed jaw means 81 for reaching around and over the body 67 of the sleeve means 65 with the individual jaws 83 of the jaw means 81 located substantially perpendicular to the center line or longitudinal axis 59 of the shaft 41 of the bolt means 39 as clearly shown in FIG. 8. Thus, the crimping means 79 is preferably modified from a mass produced hand tool by forming a unique radius in each jaw 83 to allow the jaws 83 to cover the exterior diameter of the body 67 of the sleeve means 65 with the nose or distal end of the jaws 83 having ample clearance to fit onto the body 67 of the sleeve means 65 with close proximity to the edge of the body 17 of the drum 13 as shown in FIG. 7.

The preferred method for securing the draw band 15 to the drum 13 in a tamper proof manner of the present invention includes the step of first inserting the shaft 41 of the bolt means 39 through the aperture 37 in the first lug 33 of the draw band 15 and then through the aperture in the second lug 35 of the draw band 15 after the lid 21 has been placed over the open mouth 19 of the body 17 of the drum and the draw band 15 has been placed over the outer edge 25 of the lid 21 and the lip 23 of the open mouth 19 of the body 17 of the drum 13. The sleeve means 65 is then slid over the shaft 41 of the bolt means 39 until the flange 75 of the body 67 of the sleeve means 65 contacts the edge of the second lug 35 of the draw band 15. The nut 62 is then screwed onto the threaded portion 47 of the shaft 41 of the bolt means 39, ultimately causing the first and second lugs 33, 35 of the draw band 15 to be pulled or drawn toward one another between the enlarged head 51 of the bolt means 39 and the sleeve means 65 as will now be apparent to those skilled in the art. After the first and second lugs 33, 35 of the draw band 15 have been drawn together by the coaction between the bolt means 39 and the nut 62, the sleeve means 65 is crimped to the fettered portion 49 of the shaft 41 of the bolt means 39 in one or more locations (see crimps 85 in FIGS. 5, 8 and 10) for preventing undetected subsequent separation of the first and second lugs 33, 35 of the draw band 15, as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. In combination:
   (a) a drum, said drum including a body having an open mouth and including a lid for removably closing said open mouth of said body, said open mouth of said body having a lip, said lid having an outer edge for engaging said lip of said open mouth of said body;
   (b) a draw band for encircling at least a portion of said outer edge of said lid of said drum and said lip of said open mouth of said body of said drum, said draw band including a body having a first end and a second end and including a first lug attached to said first end of said body thereof and a second lug attached to said second end of said body thereof, each of said lugs having an aperture therethrough; and
   (c) a tamper proof draw band bolt apparatus for securing said draw band to said drum, said tamper proof draw band bolt apparatus comprising:
      (i) bolt means for extending through said apertures in said first and second lugs of said draw band, said bolt means including a shaft having a first end and a second end, said shaft of said bolt means having a threaded portion and a fettered portion, said lettered portion having no angular pitch, said bolt means including an enlarged head attached to said first end of said shaft thereof;
      (ii) a nut having a threaded aperture for screwably receiving said threaded portion of said shaft of said bolt means and for allowing said bolt means and said nut to coact with one another to draw said first and second lugs of said draw band toward one another; and
      (iii) sleeve defining means for crimping to said fettered portion of said shaft of said bolt means after said first and second lugs of said draw band have been drawn together by the coaction between said bolt means and said nut and for preventing undetected subsequent separation of said first and second lugs of said draw band.

2. The combination of claim 1 in which said fettered portion of said shaft of said bolt means includes a plurality of rings on the surface of said shaft of said bolt means, each of said rings having a first side directed toward said first end of said shaft of said bolt means and a second side directed toward said second end of said shaft of said bolt means; said first side of each of said rings being substantially perpendicular to the longitudinal axis of said shaft of said bolt means.

3. The combination of claim 2 in which said threaded portion of said shaft of said bolt means is located adjacent said second end of said shaft of said bolt means, and in which said fettered portion of said shaft of said bolt means is located between said threaded portion thereof and said first end of said shaft of said bolt means.

4. The combination of claim 3 in which is included crimping means for crimping said sleeve defining means to said shaft of said bolt means, said crimping means including jaw means for covering the exterior diameter of said sleeve defining means.

5. The combination of claim 2 in which said sleeve defining means is color coded.

6. In combination:
   (a) a metal drum, said drum including a body having an open mouth and including a lid for removably closing said open mouth of said body, said open mouth of said body having a lip, said lid having an outer edge for engaging said lip of said open mouth of said body;
   (b) a draw band for encircling at least a portion of said outer edge of said lid of said drum and said lip of said open mouth of said body of said drum, said draw band including a body having a first end and a second end and including a first lug attached to said first end of said body thereof and a second lug attached to said second end of said body thereof, each of said lugs having an aperture therethrough; and
   (c) a tamper proof draw band bolt apparatus for securing said draw band to said drum, said tamper proof draw band bolt apparatus comprising:
      (i) bolt means for extending through said apertures in said first and second lugs of said draw band, said bolt means including a shaft having a first end and a second end, said shaft of said bolt means having a threaded portion and a fettered portion, said bolt means including an enlarged head attached to said first end of said shaft thereof, said fettered portion having no angular pitch and including a plurality of rings on the surface of said shaft of said bolt means, each of said rings having a first side directed toward said first end of said shaft of said bolt means and a second side directed toward said second end of said shaft of said bolt means, said first side of each of said rings being substantially perpendicular to the longitudinal axis of said shaft of said bolt means;
      (ii) a nut having a threaded aperture for screwably receiving said threaded portion of said shaft of said bolt means and for allowing said bolt means and said nut to coact with one another to draw said first and second lugs of said draw band toward one another; and
      (iii) sleeve defining means for crimping to said fettered portion of said shaft of said bolt means after said first and second lugs of said draw band have been drawn together by the coaction between said bolt means and said nut and for preventing undetected subsequent separation of said first and second lugs of said draw band, said sleeve defining means including color coded means for allowing tracing of said sleeve means.

7. The combination of claim 6 in which said threaded portion of said shaft of said bolt means is located adjacent said second end of said shaft of said bolt means, and in which said fettered portion of said shaft of said bolt means is located between said threaded portion thereof and said first end of said shaft of said bolt means.

8. The combination of claim 7 in which is included crimping means for crimping said sleeve defining means to said shaft of said bolt means, said crimping means including jaw means for covering the exterior diameter of said sleeve defining means.

9. A method for securing a draw band to a drum in a tamper proof manner; said drum including a body having an open mouth and including a lid for removably closing said open mouth of said body, said open mouth of said body having a lip, said lid having an outer edge for engaging said lip of said open mouth of said body; said draw band encircling at least a portion of said outer edge of said lid of said drum and said lip of said open mouth of said body of said drum, said draw band including a body having a first end and a second end and including a first lug attached to said first end of said body thereof and a second lug attached to said second end of said body thereof, each of said lugs having an aperture therethrough; wherein the method comprises the steps of:

(a) inserting a bolt means through said apertures in said first and second lugs of said draw band, said bolt means including a shaft having a first end and a second end, said shaft of said bolt means having a threaded portion and a fettered portion, said bolt means including an enlarged head attached to said first end of said shaft thereof; said fettered portion of said shaft of said bolt means having no angular pitch and including a plurality of rings on the surface of said shaft of said bolt means, each of said rings having a first side directed toward said first end of said shaft of said bolt means and a second side directed toward said second end of said shaft of said bolt means; said first side of each of said rings being perpendicular to the longitudinal axis of said shaft of said bolt means;

(b) attaching a nut to said bolt means, said nut having a threaded aperture for screwably receiving said threaded portion of said shaft of said bolt means and for allowing said bolt means and said nut to coact with one another to draw said first and second lugs of said draw band toward one another; and (c) crimping a sleeve defining means to said fettered portion of said shaft of said bolt means after said first and second lugs of said draw band have been drawn together by the coaction between said bolt means and said nut and for preventing undetected subsequent separation of said first and second lugs of said draw band.

10. The method of claim 9 in which said threaded portion of said shaft of said bolt means is located adjacent said second end of said shaft of said bolt means, and in which said fettered portion of said shaft of said bolt means is located between said threaded portion thereof and said first end of said shaft of said bolt means.

11. The method of claim 10 in which said sleeve defining means is color coded.

* * * * *